United States Patent Office 3,173,794
Patented Mar. 16, 1965

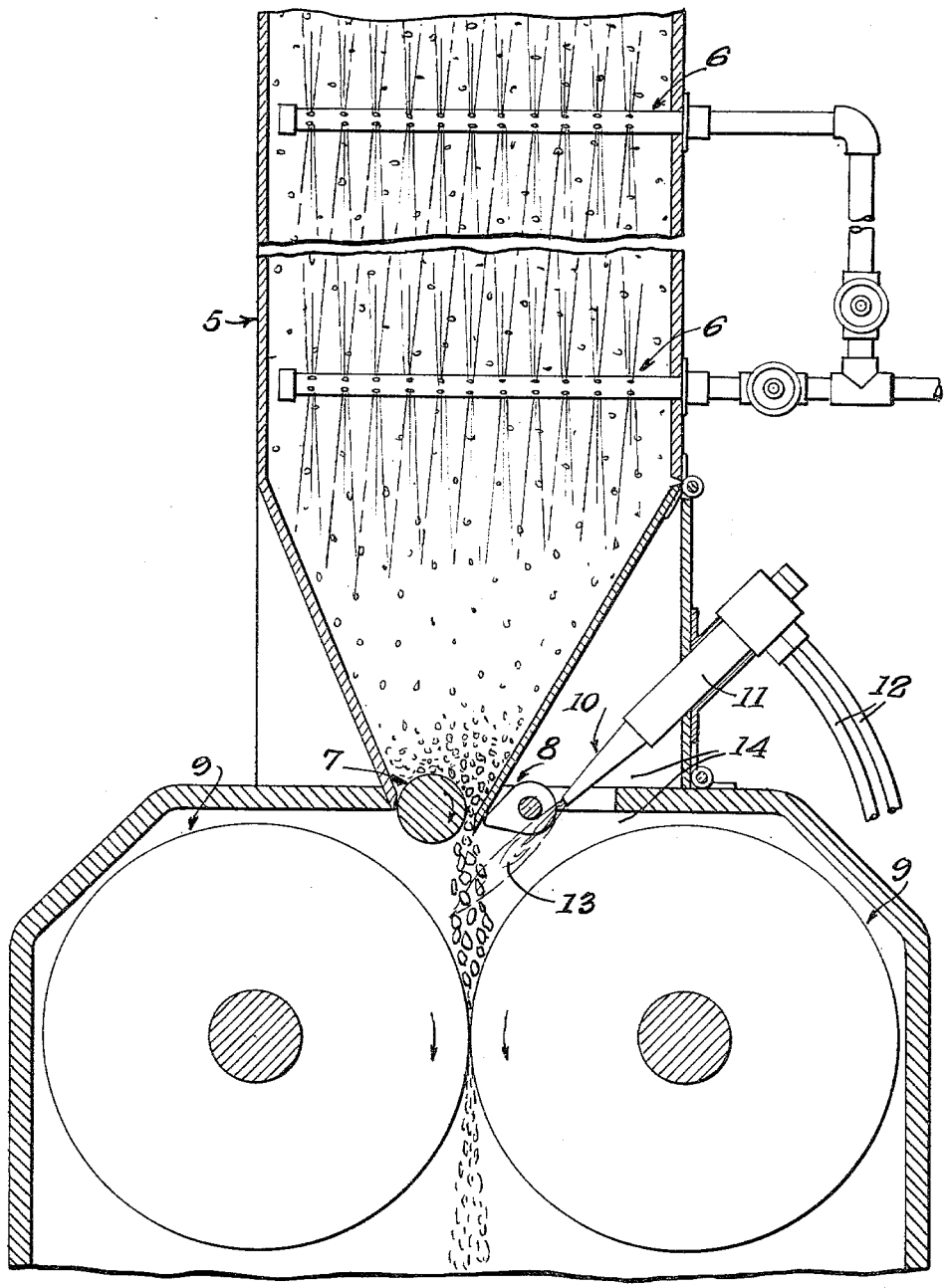

3,173,794
PROCESS AND APPARATUS FOR
TREATING GRAIN
Edward Reckon, 44589 Lowtree, Lancaster, Calif.
Filed Dec. 26, 1961, Ser. No. 161,868
6 Claims. (Cl. 99—81)

This invention relates to a process for treating grain and has for an object to provide a process for producing rolled grain that is fluffier than normally-milled grain and makes the starch therein more available for digestion.

Another object of the invention is to provide a process for treating stock-feeding grain of high starch content, such as barley and milo, and in which a quick-drying step is provided to follow the conventional steam-moistening step and prior to crushing or rolling, thereby greatly increasing the internal pressure within the kernels of grain before the same are rolled.

A further object of the invention is to provide a grain-treating process in which steam-treated kernels of grain, of high starch content, are subjected to a dry heat after the same have been moistened internally by steam to cause explosion of the kernel husks, whether by rolling the same or by application of high dry heat sufficient to expand the moisture generated by steam heating and causing the kernels to explode.

Another object of the invention is to provide, in combination with a conventional grain mill, means to dry and expand grains before milling or rolling thereof.

This invention also has for its object to provide a novel, economical and convenient method or process of superior utility.

The invention also comprises novel combinations of method steps, which will appear more fully in the course of the following description of the present method or process, the same being based on the accompanying drawing. However, the following specification merely discloses preferred embodiments of the present invention, and the same are given by way of example only.

In the drawing, like reference characters designate similar parts in the several views.

The figure shows a vertical and broken sectional view of a roller mill and provided with kernel-drying means to expand the kernels before the same are subjected to the crushing action of the crushing rolls of said mill.

The mill that is illustrated conventionally comprises a gravity feed hopper 5 down which kernels of grain fall from a supply source, means 6 within said hopper to subject the falling kernels to steam to moisten the kernel husks, means 7 at the bottom of the hopper 5 to feed such steam-moistened kernels and provided with means 8 for regulating the feed therepast, and a pair of milling rolls 9 between which the kernels are crushed or rolled to break the same into flakes or husks on which the starch in the grain is exposed to facilitate digestion of the grain by animal stock to which the same is fed.

The above-described generally conventional roller mill is provided with means 10 to effect quick drying of the steam-moistened grain to cause the kernels to expand due to internal steam expansion and to explode with such efficiency that, when crushed by the milling rolls, the broken husks are not only fluffier than when crushed in the described conventional mill, but the kernel-contained starch is so exposed on said broken husks that the same are more available for digestion by stock fed with such milled grain.

Starch grains, such as barley and milo, are usually milled before being fed to stock and, as above indicated, it is common to subject these grains to steam before milling. While the hulls or husks are mechanically crushed in the mills, the crushing results in only a partial exposure on the broken hulls of the nutriments in the grain, and, therefore, reduced availability of said nutriments for digestion by stock feeding thereon.

By the introduction of the step of quick dry heating of the grains after the same have been wetted both externally and internally by steam, an expansion of said grains or kernels is caused, as hereinbefore indicated. This expansion builds up an explosive force that takes effect to explode the grains. The exploded grains are then crushed by the milling rolls 9 to further break up the hulls. Whether only exploded by the heat or further crushed by the rolls, the nutriments within the grains have greater exposure on the surfaces of the hulls and greater availability for digestion, as before stated.

While the foregoing includes the conventional step of milling after heat drying, it is contemplated that the heat applied may be of such degree as to cause the grains to expand and explode without the need for crushing.

Since it is contemplated that the means 10 comprise a battery of open-flame burners 11 that are fed by gas fuel and/or air through tubes 12, it will be evident that, by directing the flames 13 of the several burners across the path of the grains falling from the hopper, said grains are rapidly dried during their fall and are substantially expanded before milled between the rollers 9.

It will be understood that the housing 14 of the mill is formed to retain the heat of the means 10 and that the burners 11 may be directed to heat also portions of the hopper, if such heating is desired. In any case, the heat is provided to a degree above the vaporization point of the moisture in the grains to cause the same to expand after being steam moistened. An exemplary range of flame heat that may be used is 1700° C. to 1870° C.

It will be understood that the heat applied dries the outsides of the grains while vaporizing the interior moisture to cause expansion of the grain kernels.

While the foregoing discloses what is now contemplated to be the best mode of carrying out the invention, the same is, of course, subject to modification without departing from the spirit and scope of the invention. Therefore, it is not desired to restrict the invention to the particular method steps or combination or sequence of method steps described, but to cover all equivalent steps or methods that may fall within the scope of the appended claims.

Having thus described the invention, what is claimed and desired to be secured by Letters Patent is:

1. In combination, a grain treating apparatus comprising a hopper to receive grain kernels and into which the kernels fall gravitationally, means to conduct steam for discharging into the hopper across the path of fall of the kernels to moisten the husks of the latter, means to feed the moistened kernels from the hopper to fall freely therefrom, burner means disposed to direct an open flame in the path of the falling moistened kernels to quick-dry the same and cause the inner moisture of the kernels to expand and explode the kernel husks.

2. The combination according to claim 1, and means to mill the dried and exploded kernel husks at the end of their free fall.

3. A process for treating grain that consists in the successive steps of subjecting the kernels of grain to steam to moisten said kernels both inside and outside, and subjecting said moistened kernels, while falling gravitationally, to heat, applied as an open flame directed across the path of fall of the kernels, of a degree to dry the moisture on the outside and vaporize the internal moisture to cause the husks of kernels to explode under the force of expansion thereof.

4. The combination according to claim 1, in which the said burner means includes a housing suitably adapted and disposed to retain the heat of said open flame.

5. A process for treating grain kernels having husks to expose the nutriment inside, which comprises quickly subjecting the kernels to steam to moisten the kernel husks, quick heating said grain kernels by directing flames onto the kernels with the heat thereof at a degree above the vaporization point of the moisture in the kernels for a period of time sufficient to cause the kernels to expand and to explode and to dry the exploded kernels, and then milling the dried exploded grain kernels between rollers.

6. A process according to claim 3 in which the heat is applied as an open flame directed across the path of fall of the kernels and at a temperature in the range of 1700° C. to 1870° C.

References Cited in the file of this patent
UNITED STATES PATENTS

| | | |
|---|---|---|
| 2,060,408 | Wood | Nov. 10, 1936 |
| 2,526,792 | Wells | Oct. 24, 1950 |
| 2,631,628 | McK Martin | Mar. 17, 1953 |